United States Patent
Otobe et al.

(10) Patent No.: US 7,104,138 B2
(45) Date of Patent: *Sep. 12, 2006

(54) STRAIN DETECTOR

(75) Inventors: Toshirou Otobe, Fukui (JP); Takashi Kawai, Fukui (JP); Yukio Mizukami, Fukui (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/828,233

(22) Filed: Apr. 21, 2004

(65) Prior Publication Data

US 2005/0000297 A1    Jan. 6, 2005

Related U.S. Application Data

(63) Continuation-in-part of application No. 09/749,756, filed on Dec. 28, 2000, now Pat. No. 6,761,073.

(51) Int. Cl.
G01B 7/16    (2006.01)
(52) U.S. Cl. ...................................................... 73/766
(58) Field of Classification Search ................ 73/766
See application file for complete search history.

(56) References Cited

U.S. PATENT DOCUMENTS 4,677,416 A * 6/1987 Nishimoto et al. ............ 338/35
4,771,638 A   9/1988 Sugiyama et al.
4,945,770 A   8/1990 Alvelid et al.
5,393,351 A   2/1995 Kinard et al.
6,345,543 B1 * 2/2002 Aoki ..................... 73/862.474
6,761,073 B1 * 7/2004 Otobe et al. ................. 73/766

FOREIGN PATENT DOCUMENTS

JP    8-87375      4/1996
JP    2000-180255  6/2000

* cited by examiner

*Primary Examiner*—Max Noori
(74) *Attorney, Agent, or Firm*—Wenderoth, Lind & Ponack, L.L.P.

(57) ABSTRACT

A strain detector includes an insulating substrate, a power electrode, output electrodes and a ground electrode which are disposed over the insulating substrate, a strain-resistance element provided over the insulating substrate and coupled to the power electrode, the output electrodes and the ground electrode, a protective layer over the strain-resistance element, a frame ground electrode. The insulating substrate includes a stainless steel board, a protective coat on the stainless steel board, and an insulating layer on the protective coat. The frame ground electrode is provided over the stainless steel board and electrically coupled to the stainless board.

21 Claims, 9 Drawing Sheets

STRAIN DETECTOR

This application is a Continuation-in-part of U.S. Ser. No. 09/749,756, filed Dec. 28, 2000 now U.S. Pat. No. 6,761,073.

FIELD OF THE INVENTION

The present invention relates to a strain detector for detecting a strain resulting from a load.

BACKGROUND OF THE INVENTION

Japanese Patent Laid Open Publication No. 8-87375 discloses a conventional strain detector. The conventional strain detector will be described with reference to drawings hereinafter. FIG. 9 is a top view of the conventional strain detector, and FIG. 10 is a cross sectional side view of the detector.

In FIG. 9 and FIG. 10, insulating substrate 1 made of elastic material is formed by disposing stick member 2 and insulating layer 3 thereon. Four strain-resistance elements 4 are disposed over insulating substrate 1. Strain-resistance elements 4 are electrically coupled to a pair of power electrodes 5, a pair of output electrodes 6, and a pair of ground (GND) electrodes 7 to form a bridge circuit. Protective layer 8 made of resins covers elements 4, power electrodes 5, the pair of output electrodes 6, the pair of GND electrodes 7 and the rest of insulating substrate 1

The operation of the above conventional strain detector will be described hereinafter.

When a shearing load is applied on the general-center position of the top of insulating substrate 1, a bending moment occurs in insulating substrate 1 via the shearing load and also occurs in the four strain-resistance elements 4 disposed over substrate 1. A resistance of strain-resistance elements 4 changes by the bending moment resulting in elements 4. A change of the resistance is supplied from the pair of output electrodes 6 to an external measuring device (not shown), and then the load on substrate 1 is measured.

In the conventional strain detector, only protective layer 8 made of resins is disposed over insulating substrate 1, the pair of power electrodes 5, the pair of output electrodes 6 and the pair of GND electrodes 7. Protective layer 8 made of resins absorbs water little by little. Therefore, when the strain detector is used for a long time in an atmosphere of high humidity, the water reaches strain-resistance elements 4 and the resistance of strain-resistance elements 4 fluctuates.

SUMMARY OF THE INVENTION

A strain detector includes an insulating substrate, a power electrode, output electrodes and a ground electrode which are disposed over the insulating substrate, a strain-resistance element provided over the insulating substrate and coupled to the power electrode, the output electrodes and the ground electrode, a protective layer over the strain-resistance element, a frame ground electrode. The insulating substrate includes a stainless steel board, a protective coat on the stainless steel board, and an insulating layer on the protective coat. The frame ground electrode is provided over the stainless steel board and electrically coupled to the stainless board.

DESCRIPTION OF THE PREFERRED EMBODIMENT

Exemplary Embodiment 1

Figure 1:
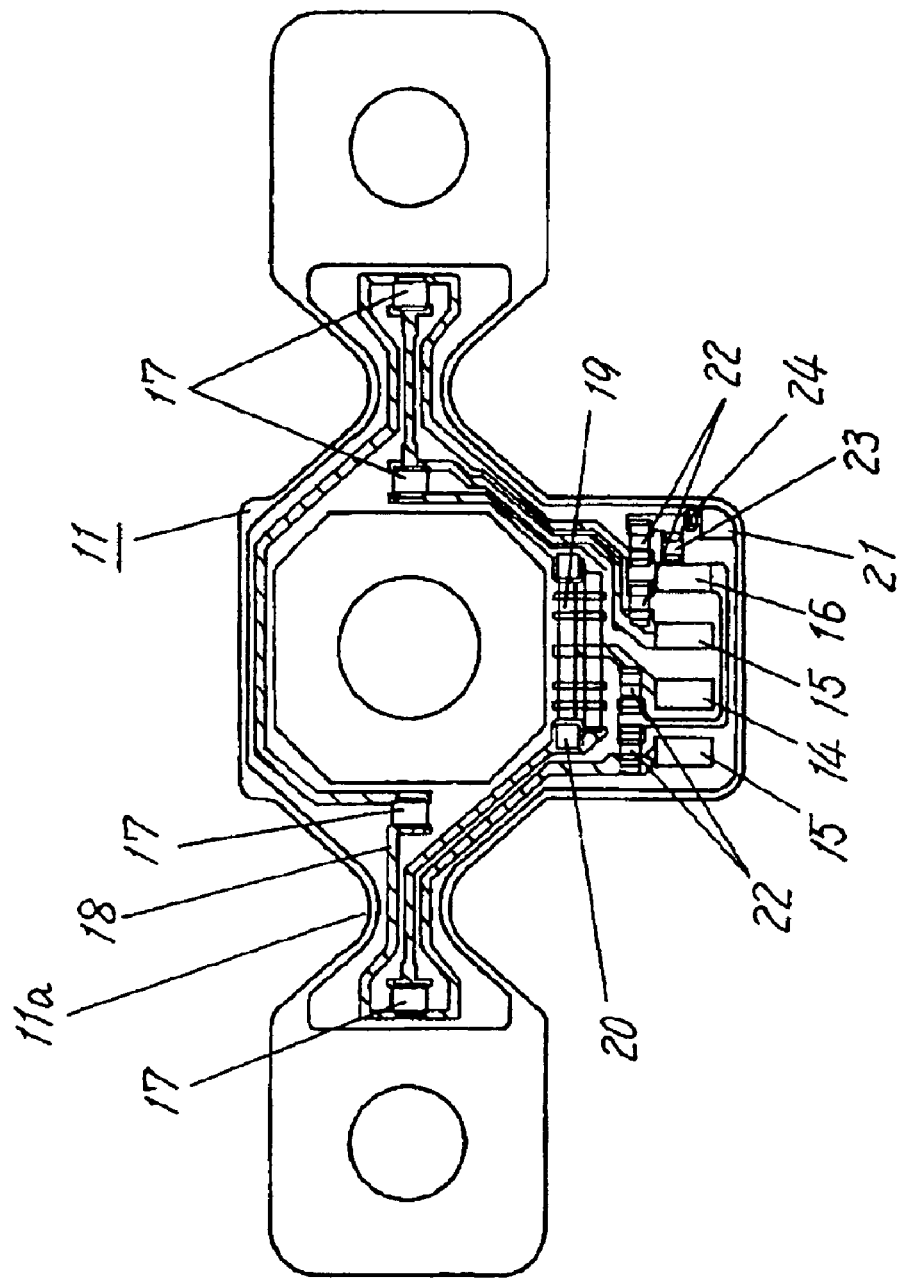
FIG. 1 is a top view of a strain detector in accordance with Exemplary Embodiment 1 of the present invention.
Figure 2:
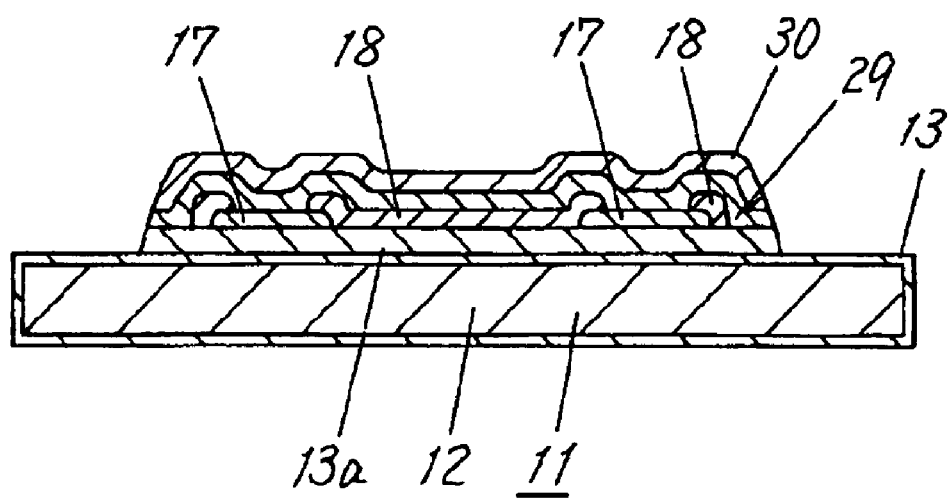
FIG. 2 is a cross sectional side view of the strain detector in accordance with Embodiment 1.
Figure 3:
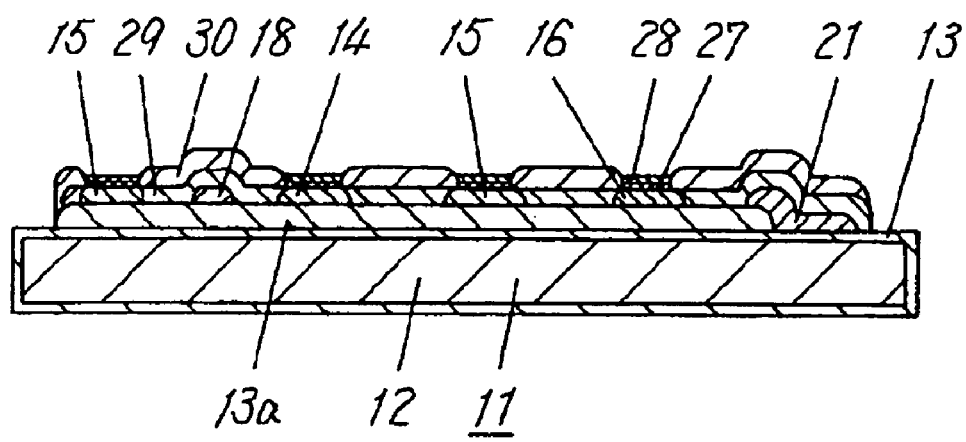
FIG. 3 is a cross sectional view of the strain detector in accordance with Embodiment 1.
Figure 4:
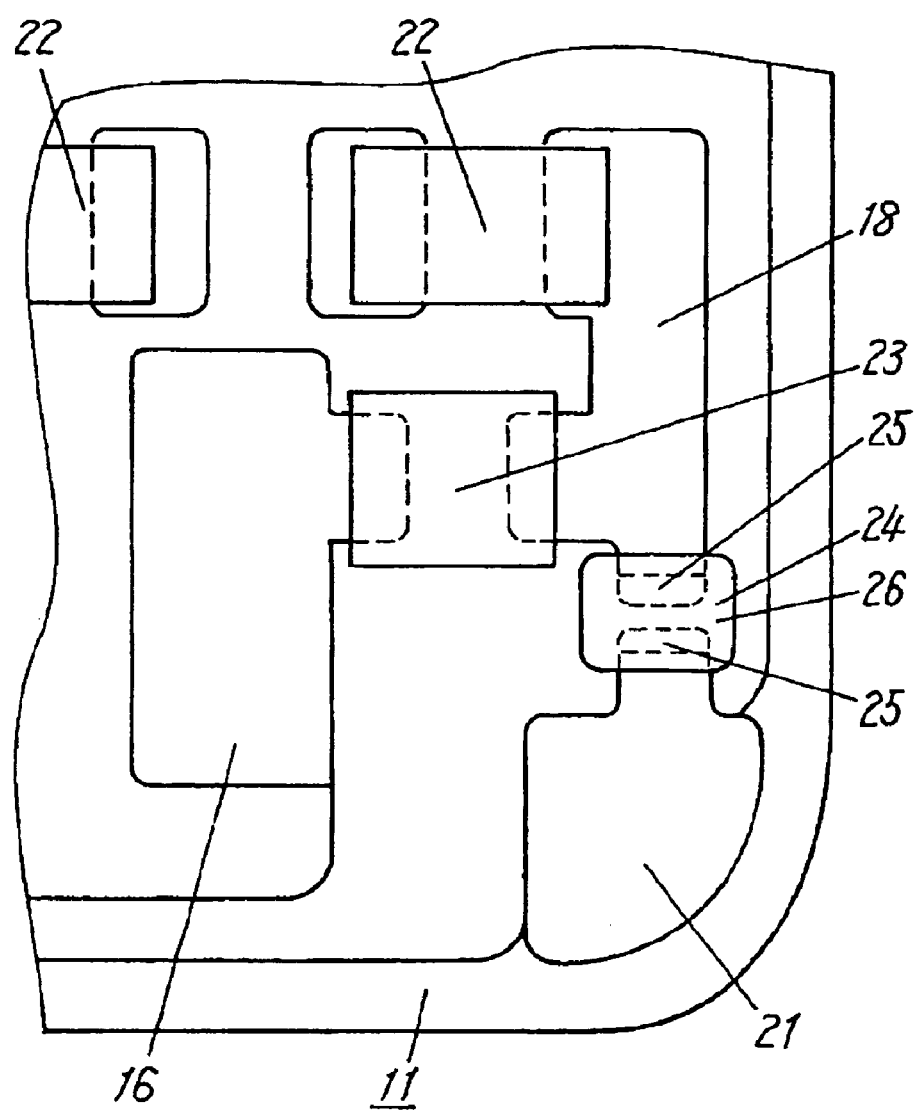
FIG. 4 is a top view of the strain detector in accordance with Embodiment 1.

FIG. 1 is a top view of a strain detector in accordance with Exemplary Embodiment 1 of the present invention. FIG. 2 is a cross sectional side view of the strain detector at a position of the strain-resistance elements disposed therein. FIG. 3 is a cross sectional side view of the strain detector at a position of electrodes disposed therein. FIG. 4 is a top view showing a state of a conductive adhesive disposed in a slit section of the insulating substrate.

In FIG. 1 through FIG. 4, insulating substrate 11 is made of elastic materials and includes stainless steel board 12 containing aluminum, protective coat 13 made of alumina disposed over board 12, and insulating layer 13a made of glass disposed over coat 13. According to embodiment 1, protective coat 13 is made of alumina, i.e., insulating material, but has a thickness of about 0.2 μm and a small resistance ranging from 2Ω to 30Ω, hence functioning as a conductive element. Power electrode 14, a pair of output electrodes 15, and ground (GND) electrode 16, which are made of silver, and strain-resistance elements 17 are electrically coupled to each other via circuit pattern 18 to form a bridge circuit. Moreover, temperature-characteristic adjusting resistor 19 used as a temperature compensation element is disposed over substrate 11. One end of resistor 19 is electrically coupled to GND electrode 16 and the other end is coupled to strain-resistance elements 17 via a pair of resistance-measuring electrodes 20. Capacitor 22 is coupled via circuit pattern 18 in parallel to static-electricity-discharging resistor 23 between GND electrode 16 on insulating layer 13a and frame ground (GND) electrode 21 on protective coat 13 and over board 12. Slit 24 is disposed in circuit pattern 18 on insulating substrate 11 so that slit 24 cuts off circuit pattern 18 partially, and a pair of slit electrodes 25 which are made of silver and electrically coupled to circuit pattern 18 is disposed at a position of slit 24. Conductive adhesive 26 electrically connects the pair of slit electrodes 25 to each other. First plate layer 27 made of nickel is disposed over power electrode 14, the pair of output electrodes 15, and GND electrode 16. Second plate layer 28 made of solder is disposed over first plate layer 27. Four strain-resistance elements 17 are arranged in pairs over insulating substrate 11, moreover, constriction section 11a is disposed between elements 17 of each pair in substrate 11. First protective layer 29 made of glass covers insulating substrate 11, power electrode 14, the pair of output electrodes 15, GND electrode 16, and temperature-characteristic adjusting resistor 19. Second protective layer 30 made of resins or glass covers first protective layer 29. Capacitors 22 are coupled between power electrode 14 and GND electrode 16 and coupled between output electrode 15 and GND electrode 16 respectively.

A method of manufacturing the above detector will be described below.

First, insulating substrate 11 is formed by previously printing glass paste over stainless steel board 12 containing aluminum and by baking at about 850° C. for about 10 minutes.

Then, metal-glaze based paste is printed where strain-resistance elements 17 and static-electricity-discharging resistor 23 are to be disposed over substrate 11, and dried at about 130° C. for about 10 minutes.

Then, thermistor-resistance-paste is printed at a position where temperature-characteristic-adjusting resistor 19 is to be disposed over insulating substrate 11. And then, four resistance elements 17, static-electricity-charging resistor 23 and resistor 19 are formed by baking at about 850° C. for 10 minutes.

Then, power electrode 14, the pair of output electrodes 15, GND electrode 16, resistance-measuring electrodes 20, circuit pattern 18, frame GND electrode 21 and slit electrode 25 are formed by printing silver paste over insulating substrate 11 and by baking at about 600° C. for 10 minutes.

At this time, stainless steel board 12 containing aluminum is not oxidized by the baking because of the high heat stability of protective coat 13 made of alumina formed over board 12. Consequently, elastic properties of substrate 11 becomes stable, and then the output of the strain detector become stable.

Then, first protective layer 29 is formed by printing a paste of glass over substrate 11 but not over power electrode 14, the pair of output electrodes 15, GND electrode 16, resistance-measuring electrode 20 and slit electrode 25, and then by baking at about 600° C. for 10 minutes.

Then, the pair of temperature-characteristic-adjusting resistors 19 are trimmed so that the pair of output electrodes 15 can output the same amount of changes according to a change of a temperature surrounding substrate 11 under the condition that a voltage is applied to power electrode 14 coupled to a power supply while GND electrode 16 is grounded.

Then, second protective layer 30 is formed by printing a paste of resins or glass over first protective layer 29 disposed over substrate 11 and by baking at about 200° C. for 30 minutes.

Then, first plate layer 27 made of nickel is formed over power electrode 14, the pair of output electrodes 15, and GND electrode 16. Then, second plate layer 28 made of solder is formed over first plate layer 27. Slit 24 breaks circuit pattern 18 to form slit electrodes 25, and further, conductive adhesive 26 is disposed at slit 24 to connect slit electrodes 25 each other, which are provided at a portion of circuit pattern 18 broken by slit 24. Namely, first plate layer 27 and second plate layer 28 are formed over power electrode 14, the pair of output electrodes 15, and GND electrode 16 under the condition of electrically disconnecting stainless steel board 12 from power electrode 14, the pair of output electrodes 15, and GND electrode 16. Therefore, partially exposed stainless steel board 12 is not plated. As each electrode becomes stable, the amount of plating in each electrode become stable. Conductive members such as jumpers can be employed instead of the conductive adhesive.

Then, conductive adhesive 26 is painted over slit 24 and the end of circuit pattern 18 adjacent to slit 24 over substrate 11.

Then, capacitor 22, for coupling both circuit patterns, coupled to power electrode 14 and GND electrode 16, respectively, is mounted and is soldered to circuit pattern 18.

Also, capacitor 22 for coupling both circuit patterns of output electrodes 15 and GND electrode 16 is mounted and soldered to circuit pattern 18.

Then, capacitor 22 and discharging resistor 23 for coupling both circuit pattern 18, connected to frame GND electrode 21, and GND electrode 16, are mounted and soldered to circuit pattern 18.

The operation of the strain detector assembled above will be described below.

When a shearing load is applied on the general-center position of insulating substrate 11, a strain occurs on the surface of substrate 11 by the load, and also a strain occurs in the four strain-resistance elements 17. When the strain occurs in strain-resistance elements 17, resistance of each element 17 changes. The change of the resistance is supplied to a measuring device (not shown), such as an external computer, from the pair of output electrodes 15, and then, the load on substrate 11 is determined.

In this strain detector, second protective layer 30 made of resins or glass covers first protective layer 29 made of glass. Therefore, even when water flows through second protective layer 30 because of using the detector in a high humidity atmosphere for a long time, the water does not penetrate through first protective layer 29 made of glass. Consequently, as water does not reach strain-resistance elements 17, the resistance of strain-resistance elements 17 does not fluctuate, and the strain detector from which can be obtained a stable output at all times is provided.

If second protective layer 30 is made of resins, it is baked at a relatively lower temperature of about 200° C. Therefore, the resistance of strain-resistance elements 17 and temperature-characteristic-adjusting resistor 19 hardly change while second protective layer 30 is being baked.

In this strain detector, temperature-characteristic-adjusting resistor 19 is disposed over insulating substrate 11; however, thermistor 31 may be disposed over substrate 11 instead of resistor 19. When thermistor 31 is disposed, it can measure a temperature of substrate 11. Even if the resistance of strain-resistance elements 17 changes because of using the detector in a temperature-changing atmosphere, the measuring device such as a computer (not shown) can compensate for the change of the resistance of elements 17. Consequently, the load on the strain detector can be exactly detected if a compensation-value calculator 31A, such as an IC chip, for the compensation is mounted on the insulating substrate 11. Wiring to an external measuring device becomes simple, and a load on the measuring device is reduced.

Figure 5:
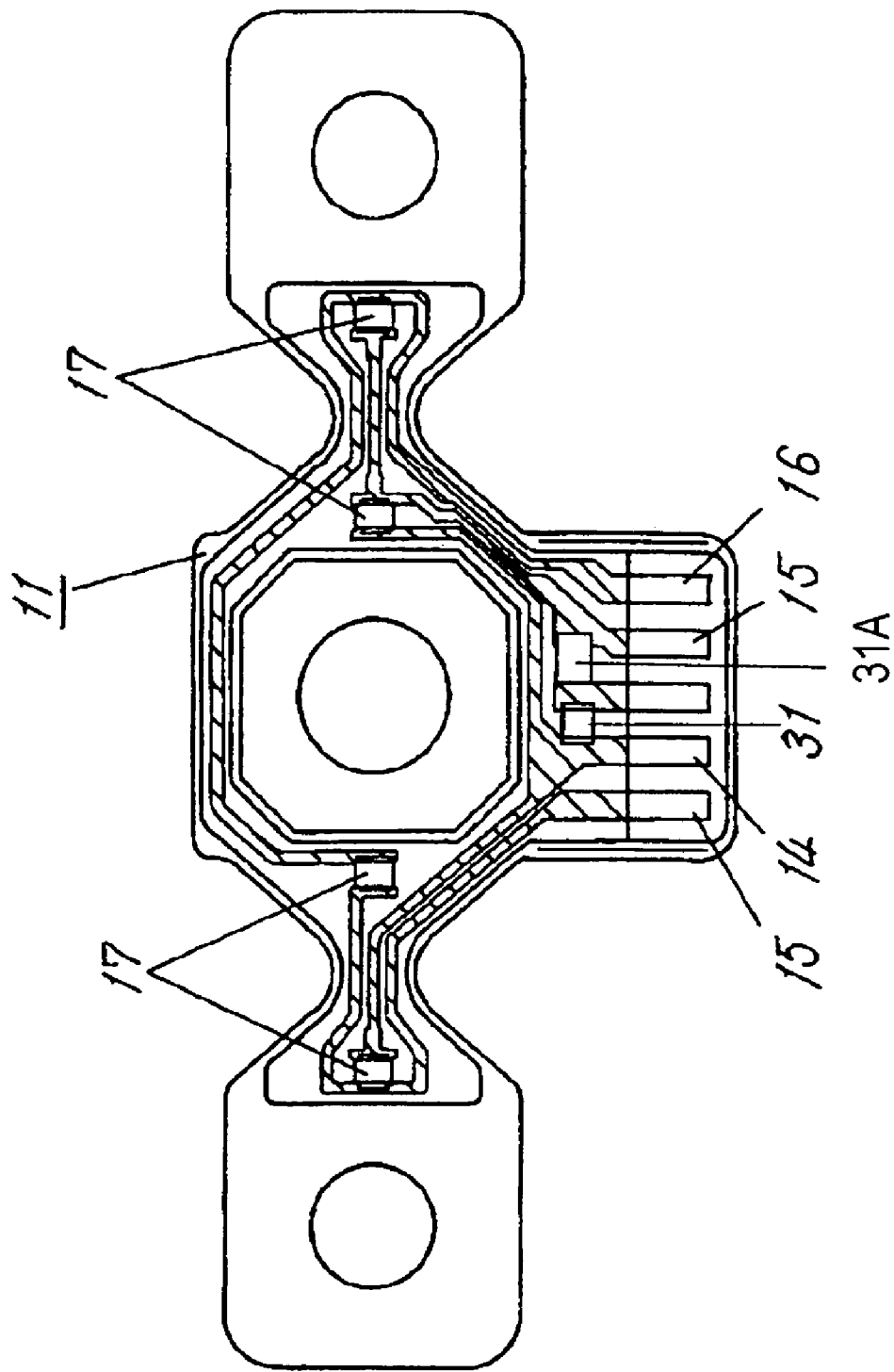
FIG. 5 is a top view of the strain detector in accordance with Embodiment 1.

The thermistor 31 is formed over substrate 11 in the same way as resistor 19. Or, as shown in FIG. 5, thermistor 31 can be mounted on substrate 11 in the same way as capacitor 22. In FIG. 5, thermistor 31 is coupled to power electrode 14; however, thermistor 31 can be coupled to GND electrode 16 or floated by itself.

Figure 6:
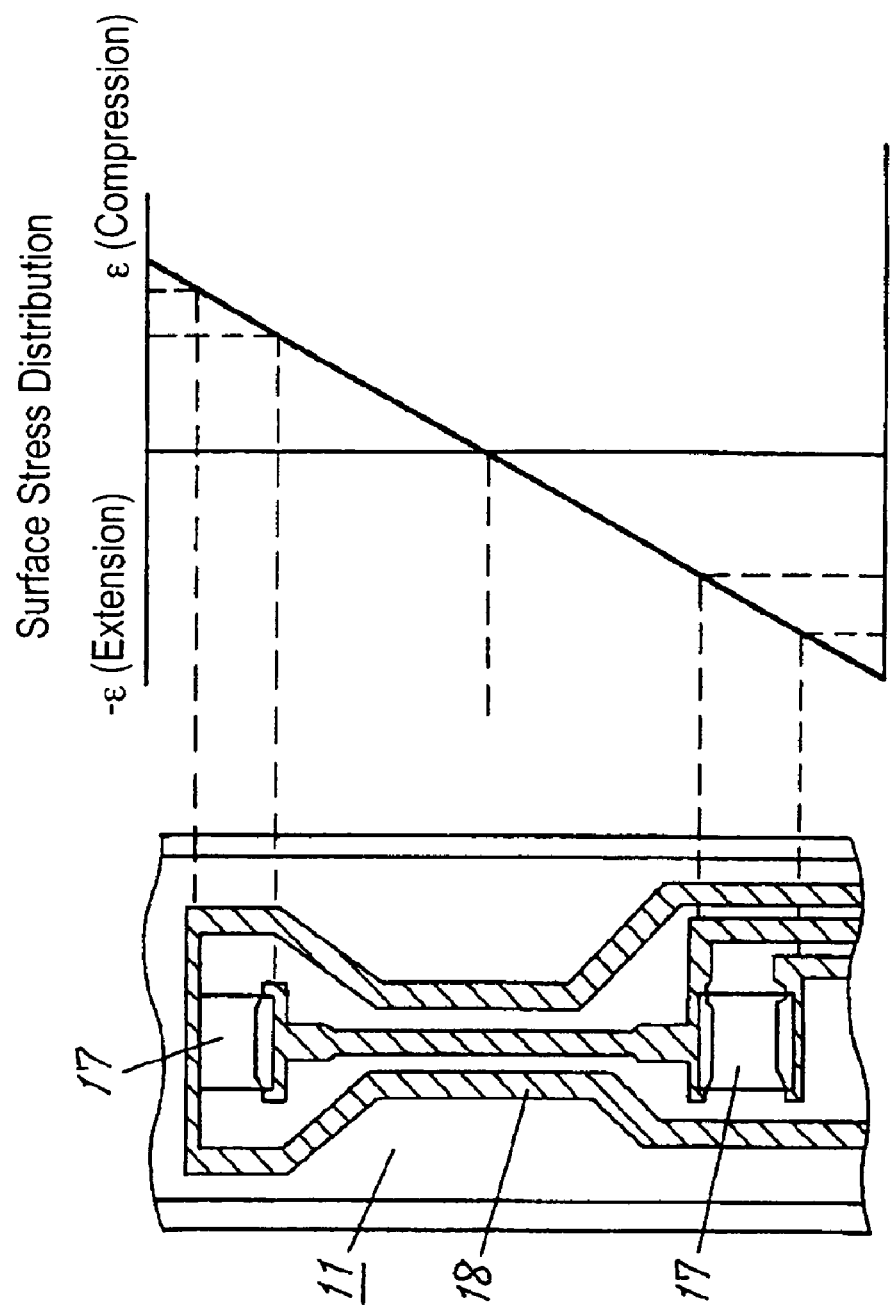
FIG. 6 shows a distribution of a stress occurring in a rectangular insulating substrate in accordance with Embodiment 1.
Figure 7:
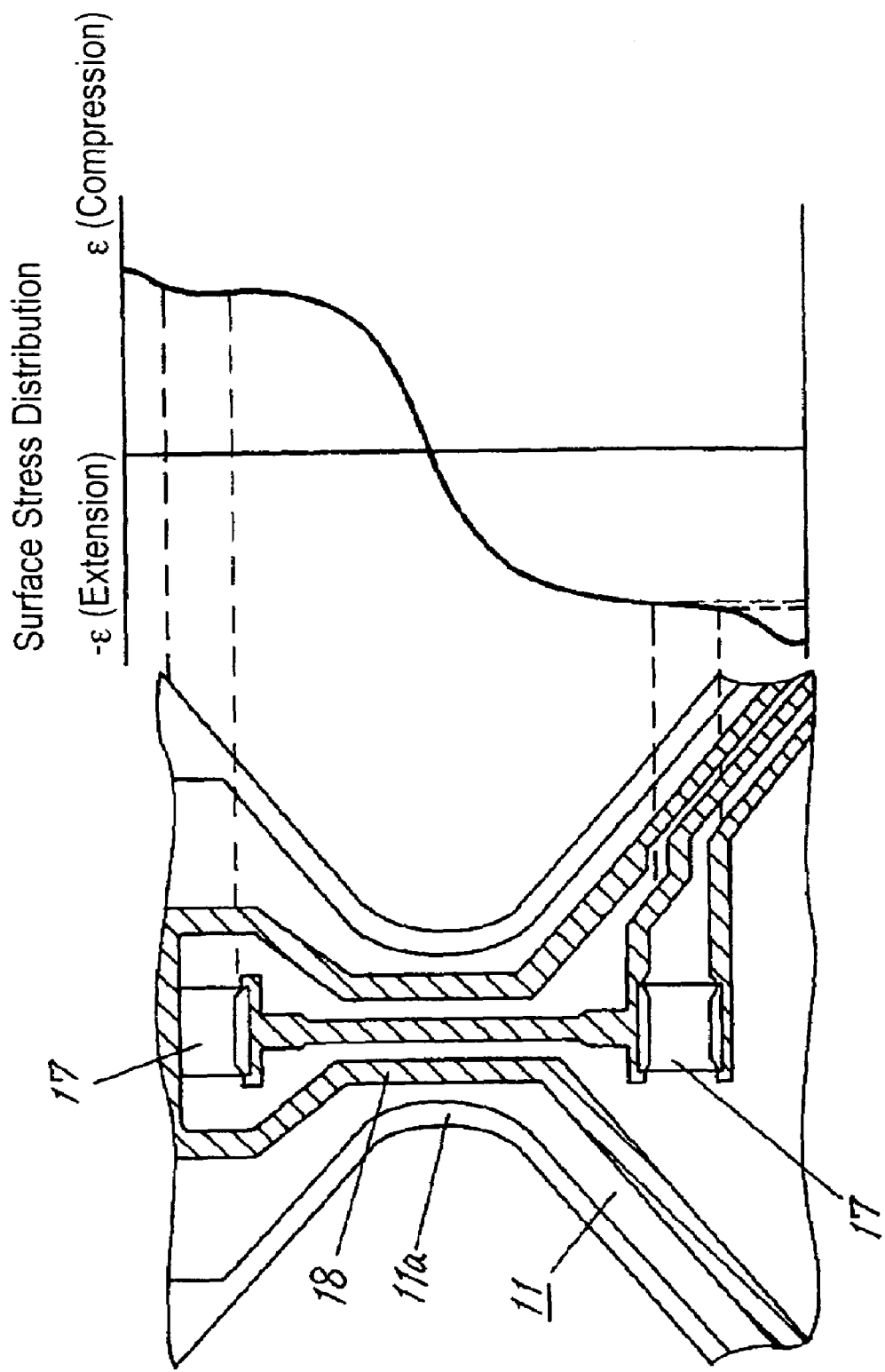
FIG. 7 shows a distribution of a stress occurring in the insulating substrate of the strain detector having a constriction section in the insulating substrate in accordance with Embodiment 1.

FIG. 6 shows an analyzed strain on insulating substrate 11. When substrate 11 is rectangular like the conventional strain detector, bending strain concentrates at the end of substrate 11. The elastic coefficient of substrate 11 therefore deteriorates. In the strain detector of Embodiment 1, constriction section 11a is disposed between strain-resistance elements 17 of each pair on substrate 11. Therefore, when a load is applied on the general-center position of the strain detector, a strain on the surface of substrate 11 is spread toward constriction section 11a from the end of substrate 11 as shown in FIG. 7. The strain does not concentrate accordingly into the end of substrate 11, and strain-resistance elements 17 can be placed at a wide area on substrate 11. And then, an assembling efficiency is improved.

For the case that static electricity more than 5 kV is applied to GND electrode 16 by touching it with a hand, the conventional strain detector requires a structure such that static electricity cannot be applied to the GND electrode. That is because the insulating layer over the substrate may break down. In the strain detector of Embodiment 1, frame GND electrode 21, which is disposed on protective coat 13, the conductive element, over stainless steel board 12 and electrically coupled to stainless steel board 12, is electrically coupled to GND electrode 16. Consequently, static electricity runs through frame GND electrode 21 and to the GND electrode 16 via stainless steel board 12. Even when static electricity is applied to the GND electrode 16, insulating layer 13a can be prevented from breaking down.

In the strain detector of Embodiment 1, a discharge element, which includes capacitor 22 and static-electricity-discharging resistor 23 connected in parallel, is coupled between frame GND electrode 21 and GND electrode 16. Therefore, even if static electricity is applied to GND electrode 16, capacitor 22 absorbs the electricity. As a result, the static electricity is controlled within a low voltage, and insulating layer 13a can be prevented from breaking down. When resistor 23 discharges the accumulated electrical charge, GND electrode 16 and frame GND electrode 21 reach the same potential. As stainless steel board 12 is not directly coupled to GND electrode 16, the potential of GND electrode 16 does not fluctuate, and output signals from the output electrodes 15 become stable.

In the strain detector of Embodiment 1, when the static electricity is applied to power electrode 14 or output electrodes 15, for example, by touching with a hand, capacitors 22 absorb an electric charge of the electricity because capacitors 22 are coupled between power electrode 14 and GND electrode 16, and between each of the pair of output electrodes 15 and GND electrode 16, respectively. Therefore, as the static electricity is controlled within a low voltage, and excessive current does not run through strain-resistance element 17, the resistance of strain-resistance elements 17 becomes stable.

According to Embodiment 1, the strain detector having the temperature-characteristic-adjusting resistor, the slit, the conductive members or the static-electricity-discharging element is described as shown in FIG. 1. The same factors can be additively disposed in the detector having a thermistor as shown in FIG. 5.

In the strain detector of Embodiment 1, first plate layer 27 made of nickel is formed over power electrode 14, GND electrode 16, and output electrodes 15, and also, second plate layer 28 made of solder is formed over first plate layer 27. Therefore, silver does not move from each electrode to second plate layer 28. As a result, the electric connections between each electrode and a terminal of an external device becomes further reliable.

Exemplary Embodiment 2

Figure 8:
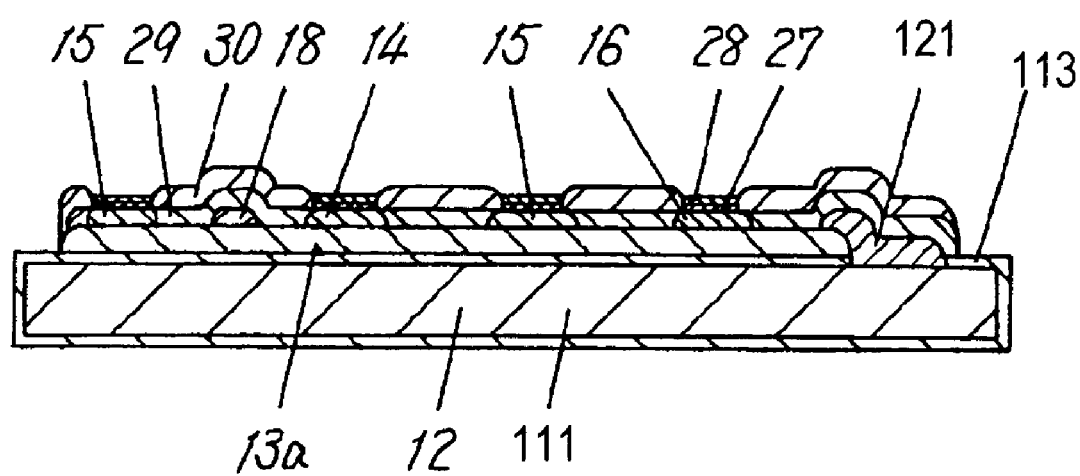
FIG. 8 is a cross sectional view of a strain detector in accordance with Exemplary Embodiment 2 of the invention.
Figure 9:
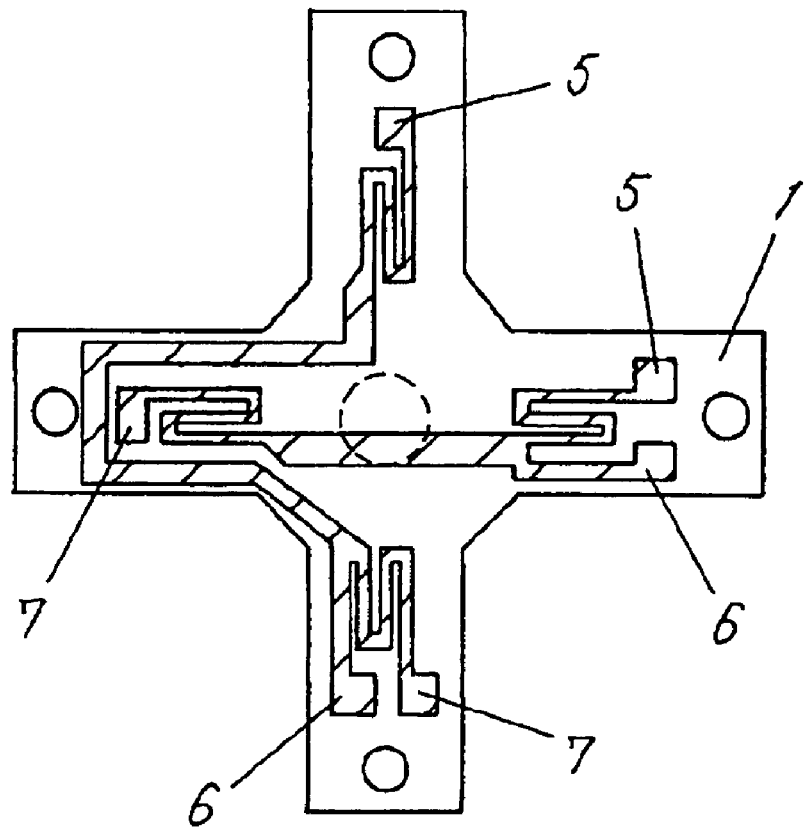
FIG. 9 is a top view of a conventional strain detector.
Figure 10:
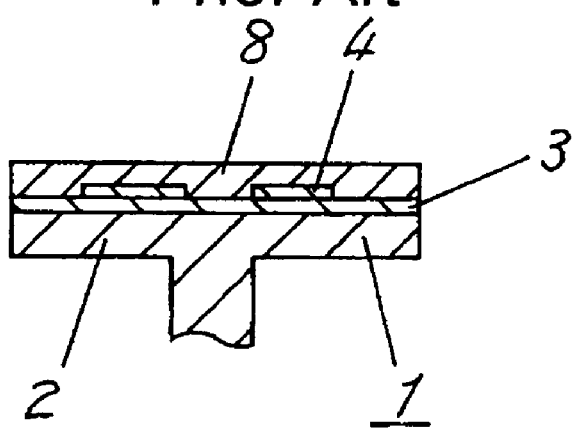
FIG. 10 is a cross sectional side view of the conventional strain detector.

FIG. 8 is a cross sectional view of a strain detector in accordance with Exemplary Embodiment 2 of the invention.

In a strain detector shown in FIG. 3 according to Embodiment 1, Frame ground (GND) electrode 21 is provided on protective coat 13, a conductive element, on stainless steel board 12, and frame GND electrode is electrically coupled to stainless steel board 12.

In the strain detector shown in FIG. 8 according to FIG. 8, insulating substrate 111 is made of elastic material and includes stainless steel board 12 containing aluminum, protective coat 113 made of alumina on board 12, and insulating layer 13a made of glass on protective coat 113. Frame GND electrode 121 functioning similarly to frame GND electrode 21 according to Embodiment 1 is provided on stainless steel board 12. Protective coat 113 is provided on a portion of stainless steel board 12 other than a portion of board 12 on which frame GND electrode 121 is provided.

For the case that static electricity more than 5 kV is applied to GND electrode 16 by touching it with a hand, in the strain detector of Embodiment 2, frame GND electrode 121 on stainless steel board 12 and electrically coupled to board 12 is electrically coupled to GND electrode 16. Consequently, static electricity runs through frame GND electrode 121 and to the GND electrode 16 via stainless steel board 12. Even when static electricity is applied to the GND electrode 16, insulating layer 13a can be prevented from being broken down.

In the strain detector according to Embodiment 2, frame GND electrode 121 contacts stainless steel board 12 directly. Therefore, a resistance between frame GND electrode 121 and stainless steel board 12 is smaller than a resistance between frame GND electrode 21 and stainless steel board 12 according to Embodiment 1 which are provided so that protective coat 13 is located between electrode 21 and board 12. The strain detector according to Embodiment 2 includes insulating layer 13a protected from static electricity more. Further, protective coat can be thick and allows stainless steel board 12 to be strong.

What is claimed is:

1. A strain detector comprising:
   an insulating substrate including
     a stainless steel board,
     a protective coat on said stainless steel board, and
     an insulating layer on said protective coat;
   a power electrode, output electrodes and a ground electrode disposed over said insulating substrate;
   a first strain-resistance element provided over said insulating substrate and coupled to said power electrode, said output electrodes and said ground electrode;
   a first protective layer over said first strain-resistance element;
   a frame ground electrode provided over said stainless steel board and electrically coupled to said stainless board;
   a circuit pattern disposed over said insulating substrate for connecting said frame ground electrode to said ground electrode, said circuit pattern having a slit formed therein to break said circuit pattern; and
   a conductive member provided at said slit for connecting a portion of said circuit pattern broken by said slit.

2. The strain detector according to claim 1, wherein said protective coat comprises alumina.

3. The strain detector according to claim 1,
   wherein said protective coat comprises a conductive element, and
   wherein said frame ground electrode is provided on said protective coat.

4. The strain detector according to claim 1, wherein said frame ground electrode is provided on said stainless steel board.

5. The strain detector according to claim 1, wherein said insulating layer comprises glass.

6. The strain detector according to claim 1, wherein said insulating substrate comprises elastic material.

7. The strain detector according to claim 1, wherein said first protective layer comprises glass.

8. The strain detector according to claim 1, further comprising a temperature-characteristic-compensation element disposed over said insulating substrate.

9. The strain detector according to claim 8, wherein said temperature-compensation element comprises a temperature-characteristic-adjusting resistor coupled to said first strain-resistance element.

10. The strain detector according to claim 8, wherein said temperature-characteristic-compensation element comprises a thermistor.

11. The strain detector according to claim 8, further comprising a compensation-value calculator for compensating an output of said first strain-resistance element based on an output of said temperature-characteristic-compensation element, said compensation-value calculator disposed over said insulating substrate.

12. The strain detector according to claim 1, further comprising:
a capacitor coupled between said power electrode and said ground electrode; and
capacitors coupled between said output electrodes and said ground electrode, respectively.

13. The strain detector according to claim 1, further comprising:
a first plate layer disposed over said power electrode, said ground electrode, and said output electrodes; and
a second plate layer disposed over said first plate layer.

14. The strain detector according to claim 13, wherein said first plate layer comprises nickel, and said second plate layer comprises solder.

15. The strain detector according to claim 1, further comprising
a second strain-resistance element provided over said insulating substrate and coupled to said power electrode, said output electrodes and said ground electrode,
wherein said insulating substrate has a constriction section provided between said first strain-resistance element and said second strain-resistance element.

16. The strain detector according to claim 1, wherein said frame ground electrode is electrically coupled to said ground electrode.

17. The strain detector according to claim 16, further comprising a static-electricity-discharging element coupled between said frame ground electrode and said ground electrode.

18. The strain detector according to claim 17, wherein said static-electricity-discharging element comprises a static-electricity-discharging resistor and a capacitor coupled to said static-electricity-discharging resistor connected in parallel to said static-electricity-discharging resistor.

19. The strain detector according to claim 1, further comprising a second protective layer on said first protective layer.

20. The strain detector according to claim 1, wherein said conductive member comprises a conductive adhesive.

21. The strain detector according to claim 19, wherein said second protective layer comprises at least one of glass and resin.

* * * * *